United States Patent [19]

Peek

[11] Patent Number: 4,655,471

[45] Date of Patent: Apr. 7, 1987

[54] WHEELCHAIR HAVING ADJUSTABLE BACKREST

[76] Inventor: Gregory A. Peek, 3900 S. Mariposa St., Englewood, Colo. 80110

[21] Appl. No.: 817,889

[22] Filed: Jan. 13, 1986

[51] Int. Cl.[4] .................................... B60N 1/06

[52] U.S. Cl. .................... 280/242 WC; 280/289 WC; 280/657; 297/61; 297/358; 297/361; 297/410; 297/DIG. 4

[58] Field of Search ............... 280/220, 242 WC, 642, 280/650, 657, 289 WC; 297/DIG. 4, 353, 355, 356, 358, 361, 396, 410, 391, 61

[56] References Cited

U.S. PATENT DOCUMENTS

| | | | |
|---|---|---|---|
| 2,579,305 | 12/1951 | Cushman | 297/361 |
| 2,694,437 | 11/1954 | Glaser | 280/657 |
| 3,882,949 | 5/1975 | Anderson | 280/242 WC |
| 4,005,903 | 2/1977 | Jenni | 297/355 |
| 4,494,792 | 1/1985 | Query | 297/358 |

FOREIGN PATENT DOCUMENTS

| | | | |
|---|---|---|---|
| 1430838 | 2/1968 | Fed. Rep. of Germany | 297/355 |
| 59650 | 6/1954 | France | 297/396 |
| 1419812 | 12/1975 | United Kingdom | 297/355 |

*Primary Examiner*—John J. Love
*Assistant Examiner*—Everett G. Diederiks, Jr.
*Attorney, Agent, or Firm*—Charles C. Logan, II

[57] ABSTRACT

A wheelchair having a backrest assembly that is pivotally connected adjacent the rear end of its seat frame. The back assembly has a rear panel fixedly attached thereto and there is structure on the front surface of the rear panel which connects to structure on the rear surface of the front panel which allows the front panel to reciprocally travel upwardly and downwardly with respect to the rear panel. There is structure for forcing reciprocal movement of the front panel and this is attached to the rear surface of the front panel and this is made possible by the cutout slot in the rear panel. The wheelchair has structure for forcing the back assembly to recline rearwardly and this is coupled together with the structure for forcing the reciprocal movement of the front panel of the back assembly so that their travel is coordinated to operate together. A second cutout slot in the rear panel allows the headrest assembly to be attached to the back surface of the front panel thus allowing the headrest assembly to travel in coordinated movement with the front panel.

6 Claims, 7 Drawing Figures

WHEELCHAIR HAVING ADJUSTABLE BACKREST

BACKGROUND OF THE DISCLOSURE

The invention relates to wheelchairs and more specifically to structure which allows the backrest portion to reciprocally travel in a sliding fashion along the longitudinal axis to the back assembly. This allows a reduction or elimination of the shear produced on the wheelchair patient's back when the back assembly is reclined.

In the past attempts have been made to eliminate the body shear forces produced on the back and buttocks of the person confined to a wheelchair when they recline the back assembly. Most of these attempts require exotic mechanisms that would coordinate travel of the back assembly with forward travel of the seat assembly. These attempts have not proven entirely satisfactory even though the price of the wheelchairs has been substantial.

It is an object of the invention to provide a novel attachment for the base frame of a wheelchair that has a back assembly that is power reclined and which also has a backrest portion subjected to sliding movement in coordination with the reclining of the back assembly.

It is also an object of the invention to provide a novel sliding backrest portion that allows the amount of reciprocal travel to be fine tuned as far as its amount of travel to fit the individual patient's need.

It is another object of the invention to provide a novel sliding backrest portion that has the headrest assembly attached thereto so that they may move as one.

It is an additional object of the invention to provide a novel back assembly having a rigid front panel for supporting the patient's back which eliminates the stretch that normally occurs with the stock fabric upholstry back panels presently being used by th wheelchair industry.

It is a further object of the invention to provide an attachment for the base frame of a standard collapsible wheelchair which gives it power operated reclining capability along with a sliding backrest portion.

SUMMARY OF THE INVENTION

Applicant's novel structure has been designed to be quickly attached to the standard base frame of a collapsible wheelchair. This structure incorporates power reclining structure for pivoting the back assembly rearwardly with respect to the seat frame. The back assembly incorporates a novel backrest formed from a rigid front panel and a rigid rear panel.

The rear panel is fixedly attached to the back posts of the back assembly. The front surface of the rear panel has a pair of round way rail members attached thereto and these rail members are matingly received in a plurality of slotted bearing blocks that have been secured to the rear surface of the rigid front panel. This structure allows the front panel to reciprocally travel along the longitudinal axis of the back assembly.

The rear panel has a cutout slot formed in it that allows structure attached to the rear surface of the front panel to protrude therethrough. This structure is mechanically connected to structure mounted beneath the seat portion. This structure is connected to the structure which forces the back assembly to recline with respect to the seat frame. What is accomplished is a forced movement of the front panel of the backrest portion which draws the front portion downwardly as the back assembly is lowered. This produces zero shear on the back of the wheelchair patient.

Additional features of the novel back assembly allow the amount of travel of the front panel to be adjusted to fit the individual patient's physical dimensions. Also the rigid aluminum front panel provides a solid foundation for positioning aids when required without inducing a shear between the patient and the positioning aids. The rigid front panel is contoured to the patient's back and it is covered with custom padding and upholstry.

DESCRIPTION OF THE PREFERRED EMBODIMENT

Figure 1:
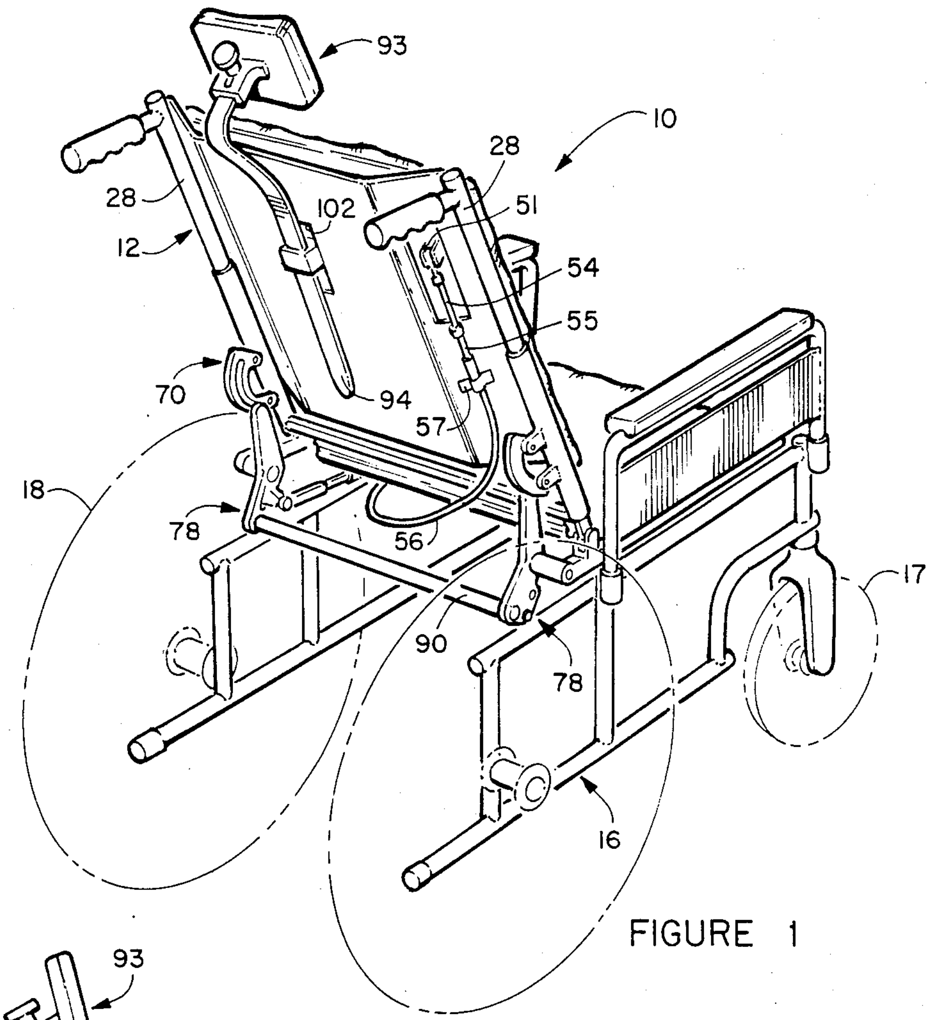
FIG. 1 is a perspective view illustrating applicant's novel attachment for the base frame of a wheelchair.
Figure 2:
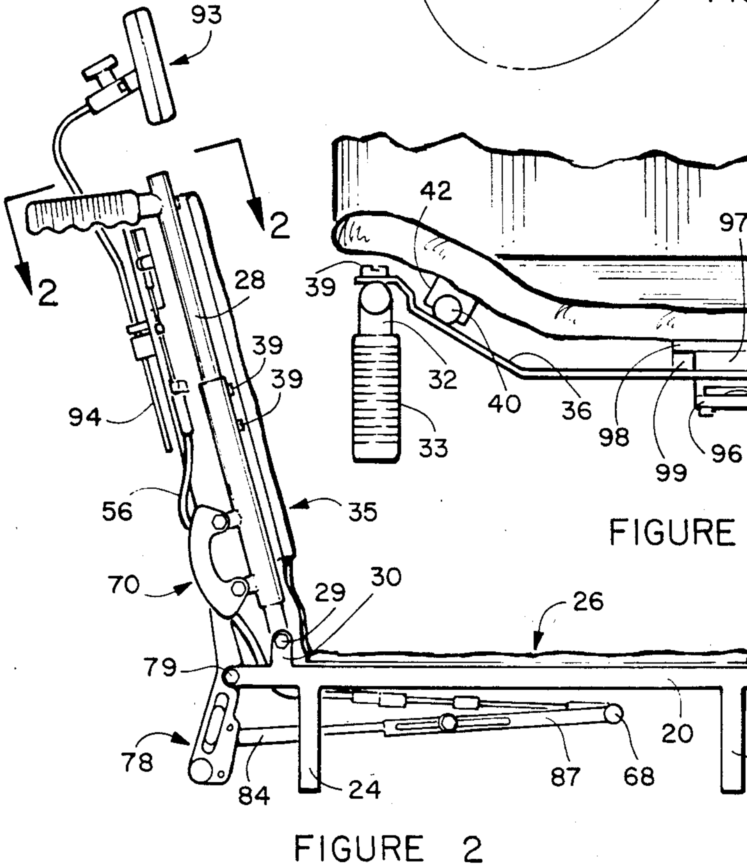
FIG. 2 is a side elevation view of applicant's novel attachment for the base frame of a wheelchair.
Figure 3:
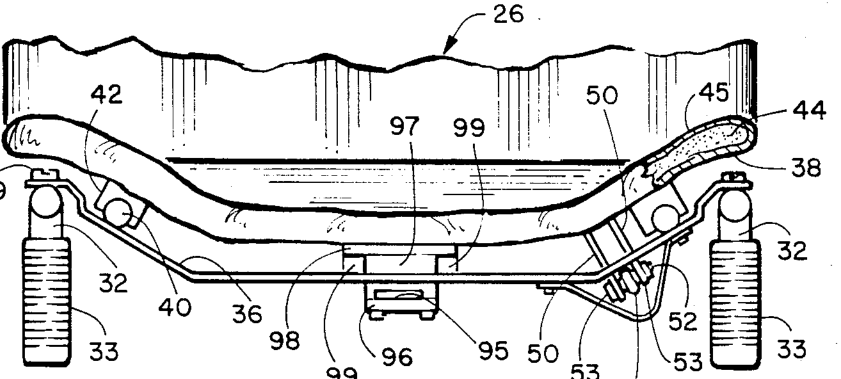
FIG. 3 is a top plan view taken along lines 3—3 of FIG. 2.
Figure 4:
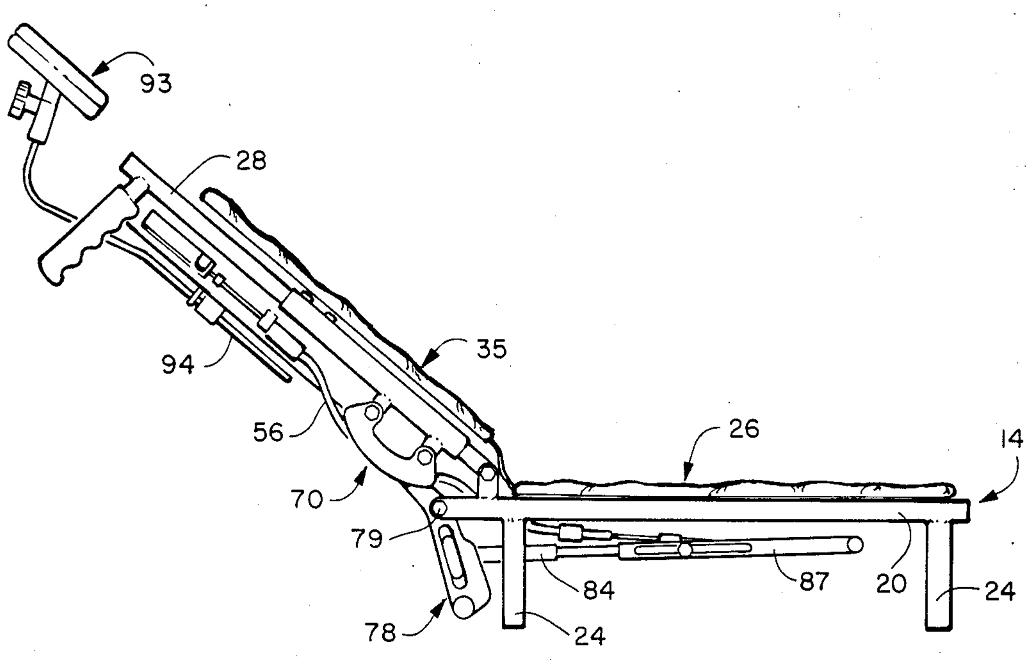
FIG. 4 is a side elevation view illustrating the back assembly partially reclined.
Figure 5:
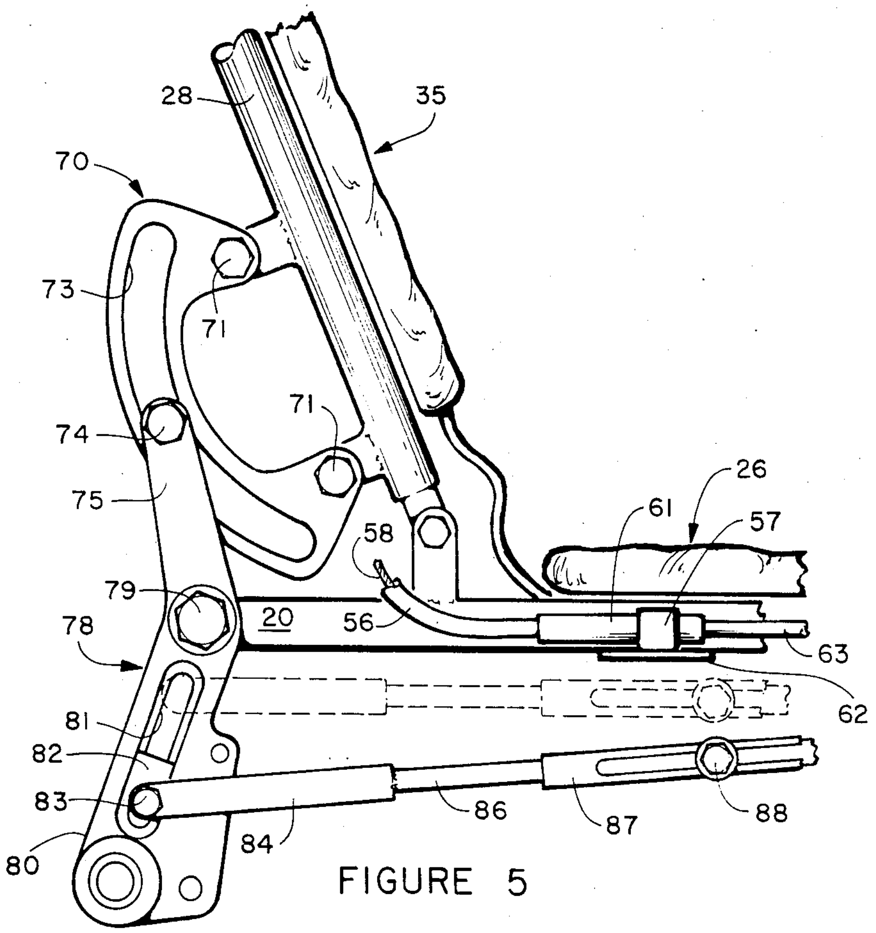
FIG. 5 is a partial side elevation view of the structure utilized for reclining the back assembly.
Figure 6:
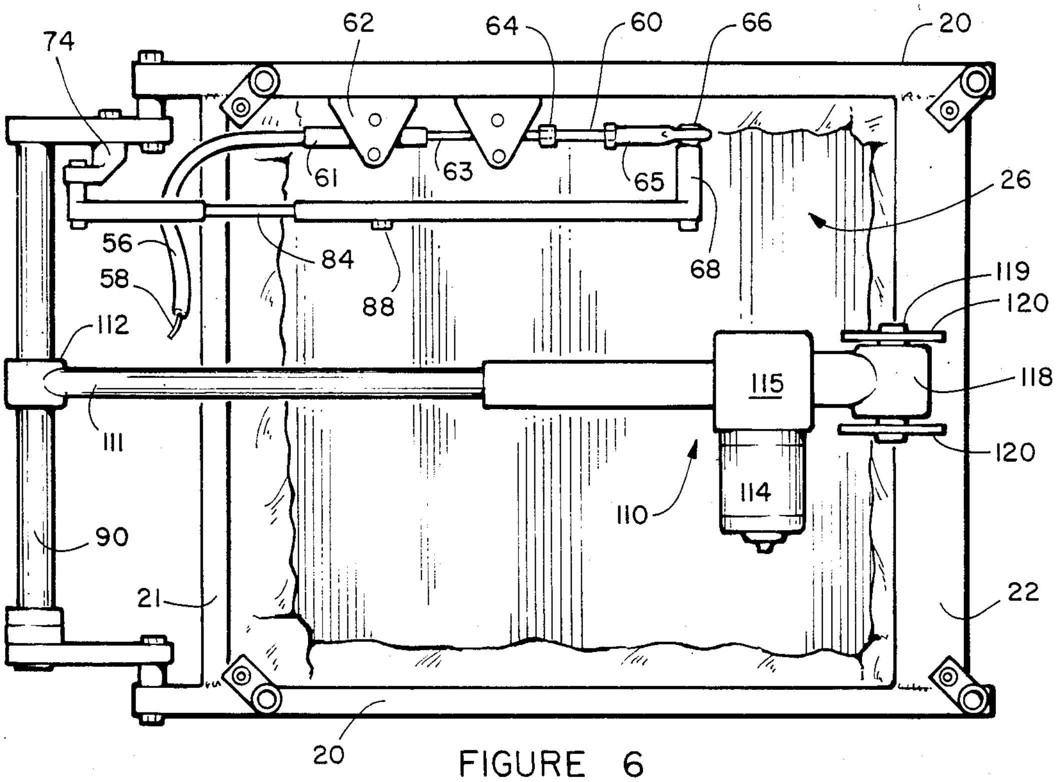
FIG. 6 is a bottom plan view of the novel attachment for the base frame of a wheelchair.
Figure 7:
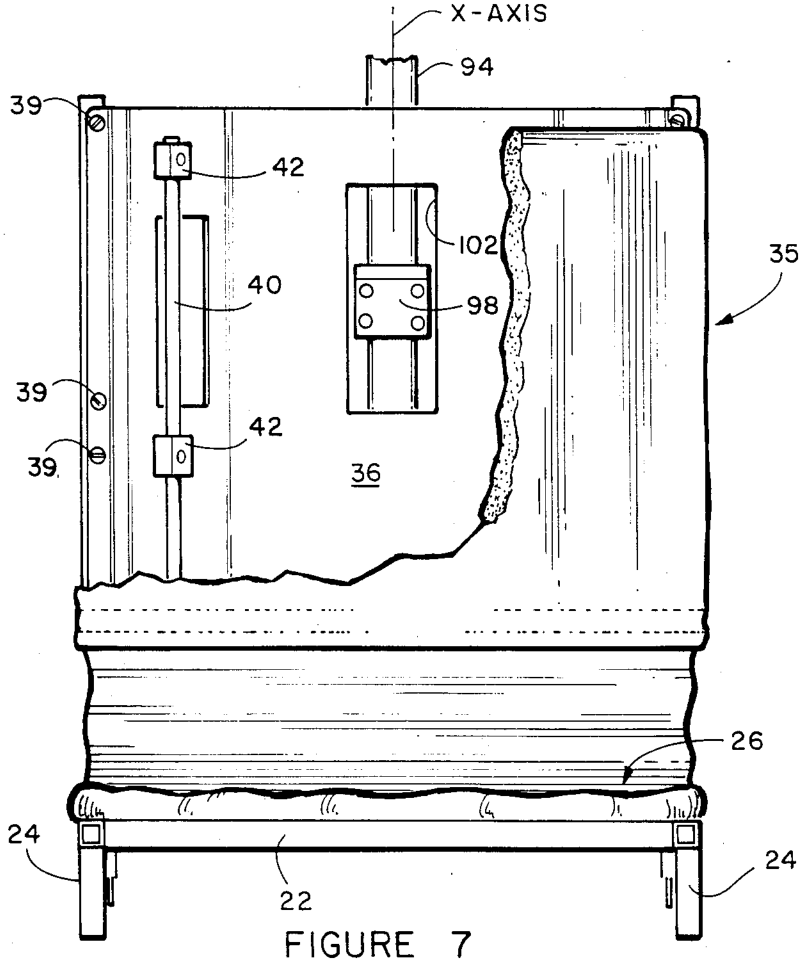
FIG. 7 is a rear elevation view of the novel attachment for the base frame of a wheelchair with portions broken away.

Applicant's novel attachment for the base frame of a wheelchair will now be described by referring to FIGS. 1–7 of the drawings. The attachment is generally designated numeral 10. It has a back assembly 12 that is pivotally attached to the rear of the sheet frame 14. The standard base frame 16 has a pair of front wheels 17 and a pair of rear wheels 18.

Seat frame 14 is formed from a pair of laterally spaced horizontal frame members 20, rear connecting frame member 21 and front connecting frame member 22. Corner posts 24 extend downwardly from these frame members and they telescope into existing structure on a standard base frame 16. Seat portion 26 is attached to the top surface of the seat frame 14.

Back assembly 12 has a pair of laterally spaced back posts 28 whose bottom ends are pivotally connected by pivot pins 29 to the top end of posts 30 that extend upwardly from the respective horizontal frame members 20. By moving the pivot point of the bottom end of the back posts 28 upwardly from the seat frame 14, the sliding amount of travel of a wheelchair patient's back during the reclining operation has been reduced from approximately 5 inches to approximately 1.5 inches in test cases. Handles 32 and handgrips 33 are attached to the top end of the respective back posts 28.

Backrest portion 35 has a rigid aluminum rear panel 36 and a rigid aluminum front panel 38. Rear panel 36 is fixedly secured to back post members 28 by screws 39. A pair of elongated round way rail members 40 are attached to the front surface of rear panel 36. They are matingly received in a plurality of slotted bearing block members 42 that are secured to the rear surface of front panel 38. Front panel 38 is covered by a predetermined amount of cushioning 44 that is in turn covered by a layer of fabric 45. Bearing block members 40 on the back of front panel 38 slide along the round way rail members 40 mounted on the front surface of rear panel 36. The sliding motion is a forced movement and the structure used to accomplish this will be described later. This structure has adjustable linkage by which the amount of movement can be predicted and adjusted to fit the patient's needs within a range of 0.75 inches to about 3.0 inches. The ability to fine tune the back and force the movement guarantees that the patient will remain in constant contact with the chair back and achieve zero shearing action. The advantage of the rigid aluminum back is to eliminate the stretch which occurs with the fabric upholstry.

The structure which produces the forced movement of the front panel 38 is best understood by referring to FIGS. 1,2,4 and 6. A pair of brackets 50 are secured to the rear surface of front panel 38. A coupling member 51 has its top end connected thereto by a pin 52 and nuts 53. Coupling member 51 is attached to the top end of rigid rod 54 which telescopes within sleeve 55. Sleeve 55 in turn is inserted into the upper end of sheath 56 which is secured to the back of rear panel 36 by a bracket 57. The bottom end of rigid rod 54 is connected to a wire cable 58 whose lower end is connected to a rod member 60. The lower end of sheath 56 is received in sleeve 61 that is mounted on support plate 62. A rod member 63 has its one end received in sleeve 61 and its opposite end threaded onto rod member 60. The one end of rod member 60 is attached to coupling 65 which is in turn connected by a pin 66 to connecting link member 68. It can be easily understood how forward travel of rod member 60 produces an equal amount of travel in rigid rod 54 thereby producing a forced sliding travel motion of front panel 38 with respect to rear panel 36. Travel of the sliding panel 38 is caused by changing the radius of bolts 83 in bellcrank 78. The shorter the radius (distance from pivot bolt 79 to connecting bolt 83), the less travel of the sliding panel. The longer the radius, the more travel by the sliding panel. As bellcrank 78 moves through an arc, linkage assembly 84,86,87,88 is pulled forward causing the end of the flexible cable 56,58,63,etc. to be pushed forward causing an equal amount of downward travel at the opposite end of the cable assembly which is attached to the sliding panel.

The structure for reclining back assembly 12 will now be described. A pair of cam brackets 70 are secured adjacent the rear surface of back posts 28 by bolts 71. Cam brackets 70 have a cam slot 73 which receive a cam follower 74 supported by the upper arm 75 of bellcrank 78. Bellcrank 78 pivots around a pivot pin 79 passing through the end of horizontal frame member 20. The lower end arm 80 of bellcrank 78 has a slot 81 with a slide member 82 traveling therein. A rod member 84 has its one end pivotally connected to slide member 82 by pivot pin 83. Rod member 84 has a reduced diameter portion 86 that telescopes into sleeve arm 87. Sleeve arm 87 is rigidly connected to connecting link 68. Screw 83 threads into arm 82 and it may be adjusted to vary the position of slide member 82 in slot 81. A shaft 90 connects the respective bellcranks 78 together.

An electrical-mechanical actuator 110 would be connected to shaft 90. Actuator 110 has a rack member 111 having a coupling 112 formed on its one end that is journaled on shaft 90. A motor 114 has a gear box 115 that drives rack member 111 forwardly and rearwardly to lower and raise the back assembly 12. The front end of actuator 110 has a coupling 118 that is pivotally attached to brackets 120 by a pin 119. Travel of shaft 90 causes coordinated movement between the reclining of back assembly 12 and the downward travel of front panel 38 of backrest portion 35.

A headrest assembly 93 has a flat tongue portion 94 that passes through panel 95 formed by plate 96 and the rear surface of block member 97. Block member 97 is secured to the rear surface of front panel 38. Stiffener plate 98 has a pair of nylon spacer bearings 99 projecting therefrom which slide upon the front surface of rear panel 36. Block member 97 passes through a cutout slot 102 in rear panel 36. It is thus easily understood that the reciprocal travel motion of the backrest portion will also cause the headrest assembly 93 to travel therealong.

What is claimed is:

1. An attachment for the base frame of a wheelchair comprising:
   - a seat frame having a front end and a rear end;
   - a back assembly having a top end and a bottom end;
   - means pivotally connecting the bottom end of said back assembly to said seat frame adjacent its rear end;
   - said back assembly having a front panel and a rear panel, said rear panel being fixedly attached to said back assembly, said rear panel having a longitudinal axis;
   - means for permitting reciprocal movement of the front panel of said back assembly along an axis parallel to the longitudinal axis of said rear panel comprising at least one slotted bearing block track and a rail member that matingly slides in said slotted bearing track, said slotted bearing block track being attached to the rear surface of said front panel and said rail member being attached to the front surface of said rear panel; and
   - means for forcing reciprocal movement of said front panel of said back assembly with respect to said rear panel comprising a bracket attached to the rear surface of said front panel, a coupling member pinned to said bracket, a driven rod member having its one end connected to said coupling and its other end connected to one end of a flexible wire push pull cable, the opposite end of said wire cable being connected to a driven rod member whereby said axial travel of said driver rod member produces the identical amount of axial travel on said driven rod member which in turn produces longitudinal travel of said front panel.

2. An attachment for the base frame of a wheelchair as recited in claim 1 further comprising means for adjusting the longitudinal travel distance of the front panel of said back assembly.

3. An attachment for the base frame of a wheelchair as recited in claim 1 further comprising means for forcing said back assembly to recline rearwardly.

4. An attachment for the base frame of a wheelchair as recited in claim 3 further comprising means for coordinating the travel of said driver rod with said means for forcing said back assembly to recline rearwardly.

5. An attachment for the base frame of a wheelchair as recited in claim 1 wherein the front panel of said backrest assembly is formed of rigid material.

6. An attachment for the base frame of a wheelchair comprising:
   - a seat frame having a front end and a rear end;
   - a back assembly having a top end and a bottom end;
   - means pivotally connecting the bottom end of said back assembly to said seat frame adjacent its rear end;

said back assembly having a front panel and a rear panel, said rear panel being fixedly attached to said back assembly, said rear panel having a longitudinal axis;

means for permitting reciprocal movement of the front panel of said back assembly along an axis parallel to the longitudinal axis of said rear panel; and a head rest assembly attached to the front panel of said back assembly and a cutout slot in the rear panel of said back assembly which allows part of said headrest assembly to extend therethrough.

* * * * *